United States Patent Office 3,289,939
Patented Dec. 6, 1966

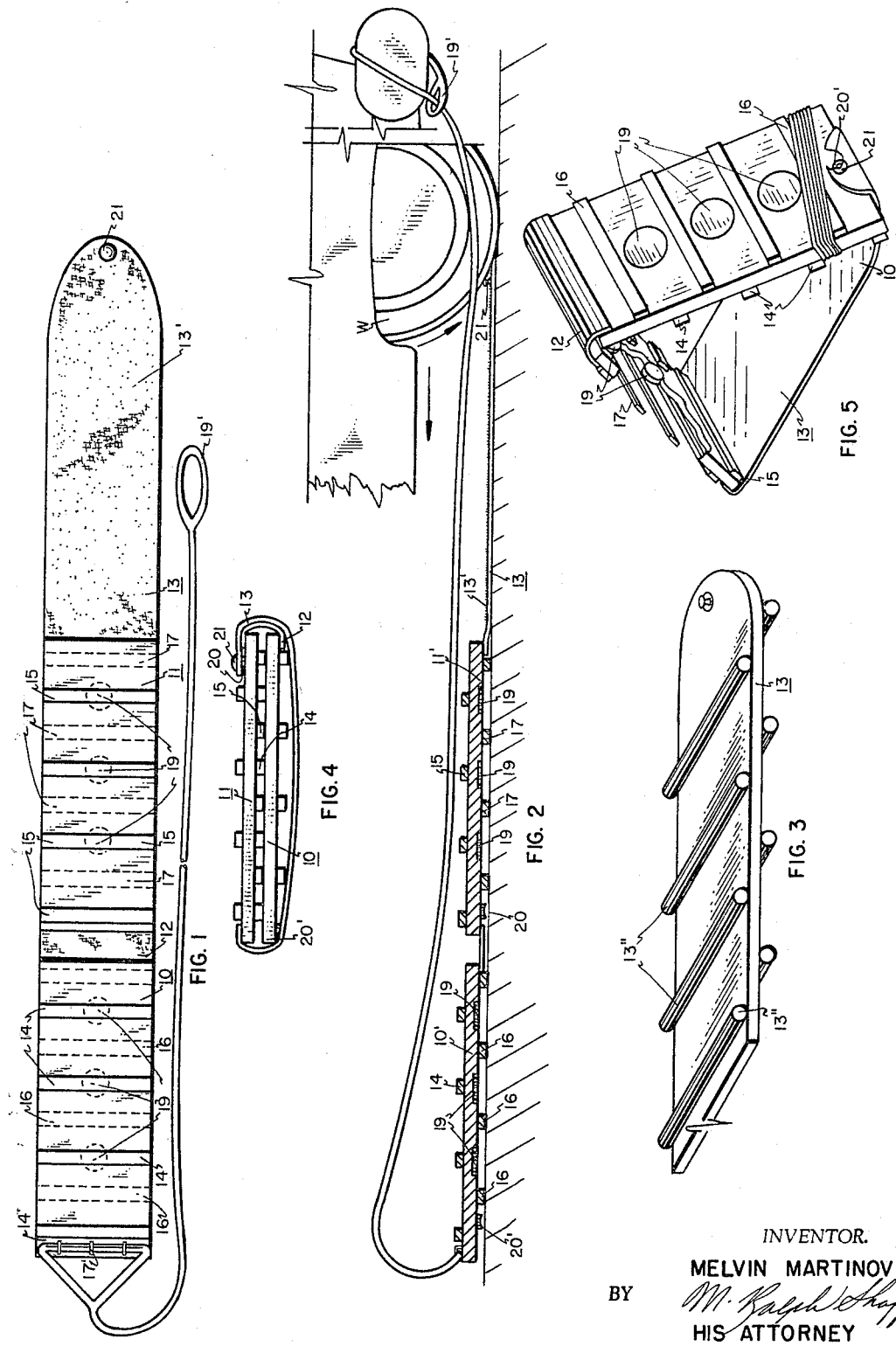

3,289,939
COMBINATION TRACTION AID AND WARNING DEVICE FOR VEHICLES
Melvin Martinov, 2698 Blue Spruce Drive, Salt Lake City, Utah
Filed Oct. 2, 1963, Ser. No. 313,359
5 Claims. (Cl. 238—14)

The present invention relates in general to devices for improving the traction presented a vehicle attempting to traverse through mud, slush, or snow and, more particularly, to a new and improved traction aid device which by its construction performs its traction function in a manner superior to prior devices, may conveniently be stored, and optionally, when modified as hereinafter explained, may be used as a warning device for highway use to indicate the presence on or near a highway of a parked vehicle.

A principal object of the present invention is to provide a new and improved traction aid to the device for use by drivers or other occupants of vehicles such as automobiles.

A further object of the invention is to provide a traction aid device which, by its construction, may be conveniently stored in the trunk of a vehicle when not in use.

An additional object is to provide a composite traction device wherein the same includes a flexible tongue easily insertable under the drive wheel of a vehicle even though the vehicle be depressed in mud or snow, and yet having a principal elongate traction member or members which are rigid so that pressures imposed thereon by the vehicle as the same traverses the device will be distributed underneath the entire surfaces of the elongate members such that these members will not tend to sink down too far into the slush, mud, or snow whereby the device would tend to be rendered less effective than that desired.

An additional object is to provide a highway device which may be used, alternatively, either as a traction aid or as a highway warning device, suitable structure being provided so that the device may be laid either flat or be disposed in an erect, upright condition to warn approaching cars of the presence of a parked vehicle on or near a highway, for example.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a plan view of the combination traction aid and warning device for vehicles as contemplated by the present invention.

FIGURE 2 is a side or edge view of the device shown in FIGURE 1 and illustrates its cooperation with a drive wheel of a vehicle with which it is to be used, and preferably, to which it is releasably attached when immediate use is contemplated.

FIGURE 3 is a fragmentary perspective view of a portion of the flexible traction tongue of the invention, indicating that cleats may be disposed in mutual space relationship upon the tongue and made a part thereof, to provide increased traction, as may be desired.

FIGURE 4 illustrates the device of FIGURES 1 and 2 as being in a folded or stored condition so that the same may be easily deposited and stored in the trunk of a vehicle.

FIGURE 5 illustrates the device of FIGURES 1 and 2 wherein the same is inverted, erected, and suitably secured by its structure so that the same may optionally serve as a highway warning device, warning approaching vehicles of the presence of a parked car on or near a highway.

In FIGURE 1 elongate traction members 10 and 11 are interconnected together by a flexible hinge member 12. The flexible hinge member 12, if of plastic material, may be secured to the respective elongate traction members 10 and 11 by suitable epoxy adhesive. A similar manner of securement is enjoyed by the flexible traction tongue 13 which, as shown, is secured to the forward extremity of elongate traction member 11. The members 10 and 11 themselves may be fabricated from a suitable, semi-rigid or, preferably, rigid plastic material.

FIGURES 1 and 2 illustrate that the elongate traction members 10 and 11 are respectively provided with tread means such as respective series of cleats 14 and 15 on their respective upper surfaces and respective series of cleats 16 and 17 on the bottom surfaces thereof. These cleats may be integrally formed with the traction members 10 and 11 or simply secured thereto by suitable means. The flexible traction tongue 13, preferably, is designed to have a traction surface 13' which is roughened. This surface may be produced either by a suitable abrasive tool or, and preferably, the flexible tongue may be made of tough plastic in which a suitable grit such as silica sand is either introduced into the plastic when being formed or is deposited thereon and secured thereto by means of a wet-adhesive surface technique common to the art. Optionally, gravel may be impregnated into the flexible traction tongue 13, or conceivably traction cleats 13'' may be disposed upon, secured to, or embedded in the traction tongue in any one of several well-known fabrication techniques.

Secured to extremity 14' of elongate traction member 10, by any suitable means such as retainer loops 17', is a flexible elongate connector 18 having looped end 19' which may be used to secure in a releasable manner the device of the invention to the bumper of a vehicle. This is illustrated in FIGURE 2.

Preferably embedded in the elongate traction members 10 and 11 and disposed contiguously with the bottom surfaces 10' and 11' of traction members 10 and 11 are plural reflectors 19. The purpose of the reflectors shall be described hereinafter.

Likewise disposed on the bottom surfaces of the traction members 10 and 11 are snap button receptacles 20 and 20' which are of conventional design and which cooperate with snap button 21 fixedly secured proximate the outer extremity of flexible traction tongue 13. The flexible traction tongue will be of sufficient length, preferably, as to be slightly longer than traction member 11 in order that when the device is folded, as shown in FIGURE 4, the snap button 21 may engage snap button receptacle 20 and keep the device in a compact storage condition as shown in FIGURE 4. This is indeed a preferred construction, in which event the traction member 10 may advantageously be chosen to be of such lengths as to be equivalent to or at least proximate the dimensions of traction member 11.

The device of the present invention operates as follows. When a user is in snow or muddy area so that insufficient traction is given to the drive wheels of the vehicle, then the user will simply unsnap snap button 21 from receptacle 20 and dispose the device as shown in FIGURE 2, urging the flexible traction tongue underneath the wheel W of the vehicle and orienting the same in the direction of intended travel of the vehicle. At the same time the user will preferably loop the flexible elongate connector 18 over the bumper of the vehicle so that when the wheel W traverses the length of the device and proceeds forwardly thereof, the device will be pulled along by the vehicle until the driver arrives at a suitable place where he can step out and remove, pack and store the device in the condition shown in FIGURE 4. The reason for making the traction tongue flexible is to permit the same to be inserted manually under the drive wheel of the vehicle and over such undulations in the surface, should the car wheel sink down below the surface as will generally be the case, so that traction will be afforded the wheel W in FIGURE 2. A stiff material for traction members 10 and 11 are desired in order that the pressure imposed thereupon by the vehicle driving over the same will be distributed uniformly along the underneath surfaces of members 10 and 11, and thereby insuring that these do not sink down into the slush, snow or mud too far for proper operation. Further, it should be mentioned that the snap button 21 rather than the snap button receptacle be disposed in an upstanding manner at the traction surface 13' of tongue 13. This is for added traction and, particularly, to insure that there will be a reduced chance of mud being tightly packed into the engaged area of the snap button 20 and receptacle 21.

While it is conceivable that merely the upper surface 13' of the traction tongue 13 may be roughened to provide a traction surface, so that the turning of wheel W will urge the traction member beneath and rearwardly of the spinning wheel, yet it is deemed preferred that the traction tongue be in fact "roughened" or provided with traction surface on both sides thereof as illustrated in FIGURE 3.

Owing to the inclusion of reflectors 19, it will be seen in FIGURE 5 that an optional use for the structure will be as an erectable warning device for highway use. Thus, if the driver has a flat tire and needs to change the tire, or if other mechanical difficulties have been incurred in connection with the automobile, then he may merely erect the device by his car as shown in FIGURE 5 in order that reflectors 19 may warn approaching vehicles of the stopped car. In such event, the tongue snap button 21 will engage snap button receptacle 20', disposed on the underside of traction member 10, as illustrated in FIGURE 5.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A traction device for use with vehicles, said traction device including, in combination, a longitudinally oriented, rigid, elongate traction member having top and bottom, roughened traction surfaces; and a flexible traction tongue secured to one extremity of said traction member, said flexible traction tongue having a roughened, upper traction surface, and wherein said bottom of said traction member is provided with light responsive reflector means.

2. A traction device for vehicles and including, in combination, a pair of elongate, rigid, traction members disposed end to end and having top and bottom, roughened traction surfaces; hinge means for securing adjacent ends of said traction members together; and a flexible traction tongue secured to an outer extremity of one of said traction members, said flexible traction tongue including an upwardly facing, roughened traction surface.

3. Structure according to claim 2 wherein the respective one of said traction members remote from said traction tongue is collapsible over said remaining traction member, at least one of said traction members and said flexible traction tongue having mutually intercooperable means for releasably securing said traction members and said tongue together in collapsed condition.

4. Structure according to claim 2 wherein the bottom surface of at least one of said traction members is provided with light responsive reflector means, said traction members and said flexible traction tongue having mutually engageable, selectively releasable fastener means for retaining said structure in collapsed condition and, alternatively, for erecting said structure in a triangle formed by said traction members, said flexible hinge member being the apex thereof, and said flexible traction tongue being the base thereof.

5. Structure according to claim 2 wherein said traction member is provided with cleat means disposed on said top and bottom surfaces thereof.

References Cited by the Examiner

UNITED STATES PATENTS

| | | | |
|---|---|---|---|
| 1,617,271 | 2/1927 | Penfield | 238—14 |
| 1,815,435 | 7/1931 | Harding et al. | 238—14 |
| 1,863,316 | 6/1932 | Webster | 238—14 |
| 3,202,358 | 8/1965 | Griswold | 238—14 |

ARTHUR L. LA POINT, *Primary Examiner.*

R. A. BERTSCH, *Assistant Examiner.*